May 14, 1957     C. TRURAN     2,791,879
GARDEN TOOL
Filed Feb. 14, 1956
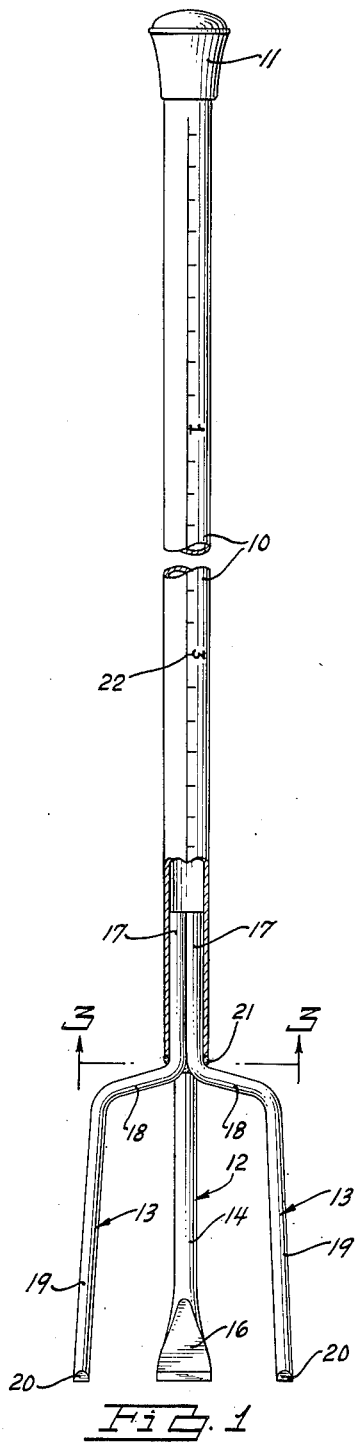
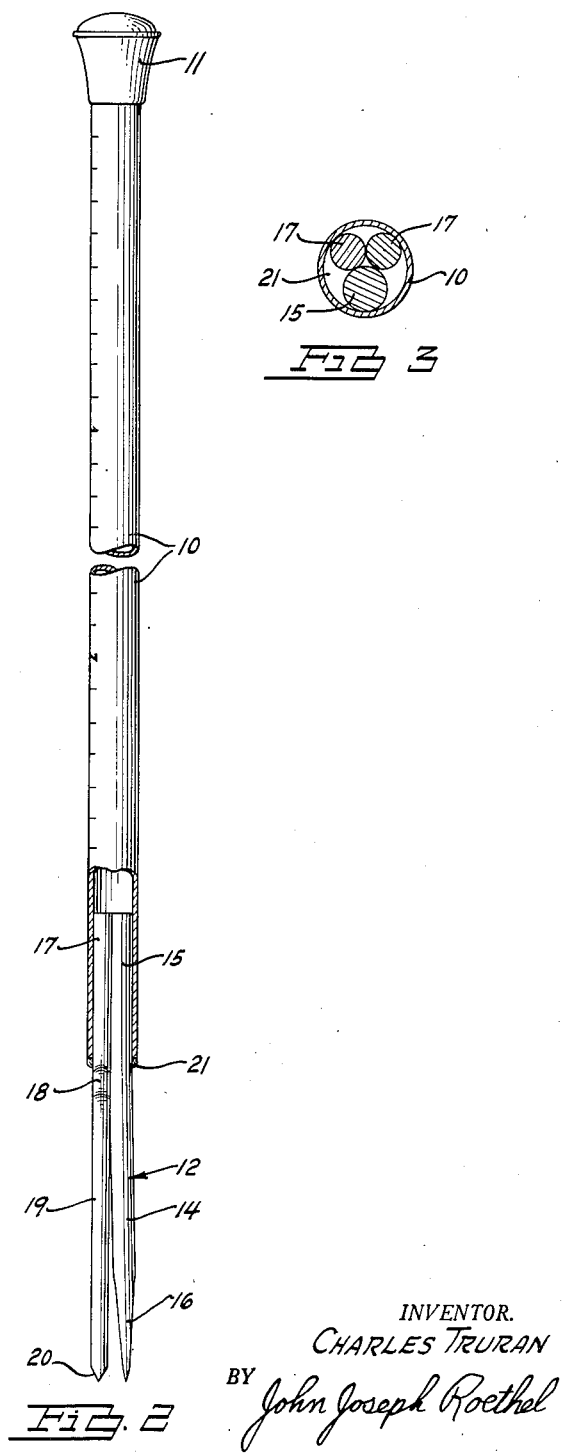
INVENTOR.
CHARLES TRURAN
BY John Joseph Roethel
ATTORNEY

United States Patent Office 2,791,879
Patented May 14, 1957

2,791,879

GARDEN TOOL

Charles Truran, Detroit, Mich.

Application February 14, 1956, Serial No. 565,489

2 Claims. (Cl. 56—400.05)

This invention relates to a garden tool and more particularly to a tool useful in cutting weeds from lawns and gardens and for cultivating and raking the beds of flowers, vegetables, bushes and the like.

The tool embodying the present invention comprises a hollow handle made preferably of light weight metal tubing, the handle being of sufficient length that a person of average height may manipulate the tool without bending over. Affixed to the lower end of the tubing are three prongs of substantially equal length, one of said prongs providing a longitudinal extension of the handle and the other two being equally spaced on either side of said one or center prong. The center prong is formed into a blade adapted to cut or slice across the roots of weeds below ground level. All three prongs provide a cultivating and raking device.

It is an object of the present invention to provide a garden tool having the foregoing general structural characteristics which is economical to manufacture and lightweight, sturdy and durable in use.

Further objects, advantages and the features of construction embodying the present invention will be apparent from the following description and appended claims, reference being had to the accompanying drawing forming a part of this specification wherein like reference numerals designate corresponding parts in the several views.

Fig. 1 illustrates a front elevation of the garden tool embodying the present invention with parts broken away.

Fig. 2 is a side elevation of Fig. 1 with parts broken away.

Fig. 3 is an enlarged sectional view taken substantially through line 3—3 of Fig. 2 looking in the direction of the arrows.

Before explaining in detail the present invention it is to be understood that the invention is not limited in its application to the details of construction and arrangements of parts illustrated in the accompanying drawing, since the invention is capable of other embodiments and of being practiced or carried out in various ways. Also, it is to be understood that the phraseology or terminology employed herein is for the purpose of description and not of limitation.

In the drawing there is illustrated a preferred embodiment of the present invention comprising a handle 10 preferably made of light-weight metal tubing, the handle 10 being of sufficient length that a person of average height may manipulate the tool in most of its applications without bending over. At its upper end the handle is provided with a rubber knob 11.

At its lower end, the handle 10 is provided with three prongs, a center prong generally designated 12 and two symmetrical side prongs each designated 13.

The center prong 12 comprises a member having a generally cylindrical shape through its center section 14, a generally cylindrical shank section 15 at its upper end and a flared blade section 16 at its lower end.

Each side prong 13, the prongs 13 being of generally cylindrical shape throughout their length, comprises a shank section 17, an angularly inclined shoulder section 18 and a main prong section 19, each main prong section terminating in a bevel 20.

Referring to Fig. 3, it will be noted that the diameters of shank section 15 and of the shank section 17 are such that the inner diameter of the handle 10 circumscribes the three shank sections. The shank sections 15 and 17 are securely held in place by filler metal 21 deposited preferably by arc welding, the void between the shank sections and the handle tubing wall being filled with the welding filler metal. Upon solidification of the weld 21, the prongs are rigidly held in their desired positions.

It will be noted in Fig. 2 that, although the shank sections 15 and 17 are substantially parallel to the longitudinal axis of the handle 10, the longitudinal axes of the center section 14 of the prong 12 and the main prong sections 19 of the prongs 13 diverge slightly from the handle longitudinal axis. Thus, looking at the tool from the side, as in Fig. 2, the blade section 16 is somewhat behind the bevelled edges 20 of the side prongs 13. It should be further noted that the bottom edges of all three prongs lie in substantially the same plane when the tool is in the upright position shown in the drawing.

As a convenience for assisting the gardener in laying out rows of plants, the handle 10 may be provided with suitable graduations 22. It will readily be understood that the handle may be of wood with a hollow sleeve at the lower end thereof to receive the shank 15 and 17 of the prongs.

The hereinabove described garden tool has many uses. As a tool for removing weeds from the lawn, it is held at an angle to the lawn surface with the center prong 12 positioned so that the cutting blade 16 thereon will cut across the weed root, the side prong bevelled edges 20 being raised above the ground level. Pressure is then applied to the tool to cause the cutting blade 16 to cut into the ground and across the weed root. It will be found that the depth of the cut necessary to accomplish the severing of the weed root may be judged by the contact of the bevelled edges 20 of the side prongs with the ground surface, it not being necessary that the bevelled edges 20 actually penetrate into the ground surface. A slight twist on the tool handle will cause the blade 16 to twist sufficiently to more or less pop the weed out of the ground.

When it is desired to use the tool as a cultivator, satisfactory cultivating action can be obtained by pressing all three prongs into the ground and twisting and rocking the tool by its handle. Satisfactory raking action can be had with the tool by holding it substantially in a vertical position as shown in the drawing and sweeping the prongs back and forth across the ground surface. In this latter or upright position the tool may also be easily used as a digging tool or clod breaking tool by pushing it straight into the earth and twisting the handle.

The general utility, the lightweight construction and the ease with which the device may be manipulated to perform its various functions makes the garden tool embodying the present invention particularly attractive to the amateur or casual gardener.

I claim:

1. A garden tool comprising a handle having a hollow portion at least at the lower end thereof, and three prong members, each of said prong members having a shank portion, said shank portions being in tangential relationship to each other and circumscribed by said hollow portion, means securing said shank portions within said hollow portion, one of said prong members being substantially a longitudinal extension of said handle with the longitudinal axis thereof diverging slightly rearwardly of the longitudinal axis of said handle, said one prong member forming the center prong of said garden tool, the other two prong members having shoulder portions angularly related to the longitudinal axis of said handle and main body portions spaced from said center prong forming side prongs, the tips of said three prong members lying in substantially the same plane, said center prong having a flared cutting blade and the side prongs having bevelled edges, the cutting edge of said blade lying rearwardly of a line through said bevelled edges.

2. A garden tool comprising a handle having a hollow portion at least at the lower end thereof, and three prong members, each of said prong members having a shank portion, said shank portions being in tangential relationship to each other and circumscribed by said hollow portion, means securing said shank portions within said hollow portion, one of said prong members being substantially a longitudinal extension of said handle with the longitudinal axis thereof diverging slightly rearwardly of the longitudinal axis of said handle, said one prong member forming the center prong of said garden tool, the other two prong members having shoulder portions angularly related to the longitudinal axis of said handle and main body portions spaced from said center prong forming side prongs, the tips of said three prong members lying in substantially the same plane, at least said center prong being provided with a flared cutting blade, the cutting edge of said blade lying rearwardly of a line through the edges of said side prongs.

References Cited in the file of this patent

UNITED STATES PATENTS

| | | |
|---|---|---|
| 203,798 | Turner | May 14, 1878 |
| 1,277,998 | Niemoth | Sept. 3, 1918 |